United States Patent
Lutz

(10) Patent No.: US 11,625,350 B2
(45) Date of Patent: Apr. 11, 2023

(54) CONTROL SYSTEM AND METHOD FOR FINE-GRAINED RECONCILIATION OF LOCAL ARCHIVES IN MASTER/MASTER SCENARIOS OF SERVERS OF A TECHNICAL INSTALLATION

(71) Applicant: Siemens Aktiengesellschaft, Munich (DE)

(72) Inventor: Benjamin Lutz, Pfinztal (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/892,223

(22) Filed: Aug. 22, 2022

(65) Prior Publication Data

US 2023/0058281 A1 Feb. 23, 2023

(30) Foreign Application Priority Data

Aug. 23, 2021 (EP) .................................. 21192504

(51) Int. Cl.
*G06F 13/362* (2006.01)
*G06F 1/12* (2006.01)

(52) U.S. Cl.
CPC .............. *G06F 13/362* (2013.01); *G06F 1/12* (2013.01)

(58) Field of Classification Search
CPC .... G06F 13/36; G06F 13/362; G06F 11/1658; G06F 11/1666; G06F 11/07; G06F 11/1448; G06F 11/1446; G05B 19/042
See application file for complete search history.

(56) References Cited

U.S. PATENT DOCUMENTS

| | | | |
|---|---|---|---|
| 2014/0173092 A1 | 6/2014 | Uluderya et al. | |
| 2015/0095690 A1* | 4/2015 | Grosch | G06F 11/2097 714/4.11 |
| 2019/0007914 A1* | 1/2019 | Won | H04L 41/0816 |
| 2022/0247813 A1* | 8/2022 | Nishida | H04L 67/1034 |

FOREIGN PATENT DOCUMENTS

| | | |
|---|---|---|
| EP | 3637205 | 4/2020 |
| EP | 3736647 | 11/2020 |
| WO | WO 2014/099906 | 6/2014 |

\* cited by examiner

*Primary Examiner* — Raymond N Phan
(74) *Attorney, Agent, or Firm* — Cozen O'Connor

(57) ABSTRACT

A control system for a process or manufacturing installation includes a first and second operator station servers, wherein one operator station server operates as master and the other of operates as slave that inherits master functionality when the master fails, respective data archives are implemented on the first and second operator station servers, the first and second operator station servers each receive data of the technical installation and record it in the respective data archive, and the first and second operator station servers each ascertain a respective health state, where the first and second operator station servers continuously record in the respective data archive, at specified time intervals, which health state the respective operator station server has when receiving and recording the data of the technical installation, and whether the respective operator station server acts as master or as slave in the respective time interval.

10 Claims, 5 Drawing Sheets

CONTROL SYSTEM AND METHOD FOR FINE-GRAINED RECONCILIATION OF LOCAL ARCHIVES IN MASTER/MASTER SCENARIOS OF SERVERS OF A TECHNICAL INSTALLATION

BACKGROUND OF THE INVENTION

1. Field of the Invention

The invention relates to use of a control system for operation of a technical installation, in particular a process or manufacturing installation, a method for operating a control system provided with redundancy for the technical installation and to a control system for the technical installation, which has a first operator station server and a second operator station server, where one of these operator station servers is configured to operate as a master and the other of these operator station servers is configured to operate as a slave which is configured to inherit the function of master in the event that the master fails, a first data archive is implemented on the first operator station server, a second data archive is implemented on the second operator station server, the first operator station server and the second operator station server are configured to receive data of the technical installation and to record the received data in the respective data archive, and where the first operator station server and the second operator station server are each configured to ascertain a respective health state.

2. Description of the Related Art

To improve the availability resulting from hardware failures, components in technical installations, such as in the process industry, are often designed with redundancy. If one component fails, then it is immediately replaced by its redundant partner.

Specifically in operator station servers of a control system of a process installation, the availability thereof plays a decisive role in the context of the potential for operator control and monitoring of the process installation. The operator station servers are generally operated in what is known as hot standby mode, i.e., the process images of both operator station servers (master and slave) are always up to date and are reconciled with one another.

Both the master and the slave receive value changes from the automation. During reconciliation, the slave compares the value changes obtained from the automation with the value changes forwarded by the master. If these match, then the slave writes the value changes into the process image. If the master fails, then the slave can immediately stand in (without booting up or a general reconciliation) (new master)—in this context the value changes that have not yet been reconciled are inherited into the process image for seamless operator control and monitoring/history.

A configuration of this kind, which is known per se, is shown by way of example in FIG. 1. A control system 1 of a technical installation comprises a first operator station server 2 and a second operator station server 3. The control system 1 additionally comprises an operator station client 4, an automation device 5 and a peripheral device 6. The automation device 5 (for example, a SIMATIC PCS7 S7-400 from SIEMENS) and the peripheral device (for example an ET 200 SP from SIEMENS) are interconnected via a field bus 7 (which is based on PROFIBUS DP, for example). The two operator station servers 2, 3 are connected to the automation device 5 and to one another via an installation bus 8. The two operator station servers 2, 3 are connected to the operator station client 4 via a terminal bus 9. The installation bus 8 and the terminal bus 9 can be formed as an industrial Ethernet, for example, without being limited thereto.

The first operator station server 2 and the second operator station server 3 are designed with redundancy in relation to one another. The first operator station server 1 acts as master and is responsible for the archiving and the operator control and monitoring by the operator station client 4. This means that the writing of measurement values (process values, for example) by the automation device 5 or the setting of manipulated variables by an operator only takes place on the master, which then implements a reconciliation with the second operator station server 4 as slave.

The reconciliation of the first operator station server 2 (as master) with the second operator station server 3 (as slave) occurs, as shown in FIG. 1, via the (failsafe and accordingly high-performance) installation bus 8. In addition to information such as a process image, status information regarding the health state (health index) of the two operator station servers 2, 3 is exchanged (in a bidirectional manner here), in order to be able to nominate the operator station server 2, 3 that has the best health state as master in a coordinated manner.

As long as a master can be unambiguously determined, failures or partial failures of an operator station server 2, 3 can be fully intercepted and the availability of the technical installation can be ensured. If what are known as master/master scenarios occur due to certain circumstances, then the known configuration of operator station servers 2, 3 designed with redundancy, with reconciliation via the installation bus 8 (also in the case of two-way redundancy), may lead to the problems described hereinbelow.

A master/master scenario may appear when both operator station servers 2, 3 have lost contact with one another, because for example the installation bus 8 has been severed or an intermediate network device (not shown in FIG. 1) or a network card have failed. The consequence of this master/master scenario is that, at the same time, two measurement archives implemented on the operator station servers 2, 3 are filled with measurement data independently of one another. It is known to discard one of the two archives after restoring the redundancy. This generally involves the archive of the slave determined following the restoration. This may be correct, partially correct or entirely incorrect—depending on which temporally variable interferences have occurred on the operator station servers 2, 3 during the master/master scenario.

Other approaches track the long-term archiving of both archives, which leads to an enormous increase in the memory requirement, however. Moreover, the archive that has thus been compiled in duplicate also must be cleaned again, because an unambiguous "historical thread" must be available no later than when archived data is accessed (when a trend display is opened, for example).

EP 3 637 205 A1 and EP 3 736 647 A1 disclose exemplary conventional control systems that present an operator with installation images with various objects via a plurality of operator station servers.

SUMMARY OF THE INVENTION

It is an object of the invention to provide a control system provided with redundancy for a technical installation, which enables an improved archiving of data of the technical installation.

This and other objects and advantages are achieved in accordance with the invention by a control system for a technical installation, in particular a manufacturing or process installation, by a method for operating a control system provided with redundancy for the technical installation and by the use of the control system for operation of the technical installation, where the first operator station server and the second operator station server of the control system in accordance with the invention are each configured to continuously record in the respective data archive, at specified time intervals, which health state the respective operator station server has when receiving and recording the data of the technical installation, and whether the respective operator station server acts as master or as slave in the respective time interval.

In the present context, a control system is understood to mean a computer-aided technical system that comprises functionalities for representing, operating and controlling a technical system, such as a manufacturing or production installation. In addition to the two operator station servers, the control system may comprise an operator station client and, for example, also what are known as process or manufacture-oriented components, which serve to activate the actuators or sensors.

The technical installation may involve an installation from the process industry, such as a chemical, pharmaceutical or petrochemical installation, or an installation from the food and beverage industry. This also encompasses any installations from the production industry, factories, in which automobiles or goods of all kinds are produced, for example. Technical installations that are suitable for performing the method in accordance with the invention can also come from the power generation sector. The term "technical installation" also encompasses wind turbines, solar installations or power generation plants.

In the present context, an "operator station server" is understood to mean a server that centrally captures data of an operator control and monitoring system and generally also alarm and measurement value archives of a control system of a technical installation, and makes this data available to users. The operator station server generally establishes a communication connection to automation systems (such as an automation device) of the technical installation and forwards data of the technical installation to what are known as "operator station clients", which are used for operator control and monitoring of an operation of the individual functional elements of the technical installation.

The operator station server may itself have client functions for accessing the data (archives, messages, tags, variables) of other operator station servers. This means that images of an operation of the technical installation on the operator station server can be combined with variables of other operator station servers (server-server communication). The operator station server can be a SIMATIC PCS 7 industrial workstation server from SIEMENS, without being restricted to this.

An operator is understood to mean a human user of the technical installation. The operator interacts with the technical installation or the control system thereof by means of specific user interfaces and controls specific technical functions of the installation. To this end, the operator may use the operator control and monitoring system of the control system with the operator station servers and an operator station client that may be present.

The data of the technical installation, in the case of a process installation, may involve process data, such as pressure values, temperature values or fill level values, but also messages. The data may represent raw data of sensors. The data may also, however, have been processed by a measurement transducer, a peripheral device, an automation device or another device embodied for this purpose.

The two operator station servers provided with redundancy of the control system in accordance with the invention continuously store the received data in a respective data archive. In this context, the data is stored at arbitrary, specified time intervals. Here, the two operator station servers are particularly advantageously configured to also record a health state of the respective operator station server in the data archives, in a corresponding manner to the received data. In a known manner, the two operator station servers are capable of ascertaining their own health state ("server health"). An exemplary disclosure relating to the forwarding of information relating to the health state of servers can be found in WO 2014/099906 A1. The health state may be expressed on a scale from 1 (unhealthy) to 6 (healthy), for example.

In addition to the health state, whether the respective operator station server has performed the role of a master or a slave is also recorded for each time interval.

Due to the embodiment in accordance with the invention of the control system or the operator station server thereof, the data archives of the two operator station servers can be effectively synchronized by performing an optimization in relation to the health state and/or the function as master/slave.

Preferably, the control system is configured to synchronize the two data archives of the first operator station server and the second operator station server following the storing of the data, the health status and the master/slave function such that, following the synchronization in both data archives, for each time interval, the data of the operator station server that has the best health state in the respective time interval is recorded. For each time interval, expressed in other words, the data of the operator station server that has the higher health status in the time interval is selected for the consolidation of the data archives.

Such a synchronization of the two operator station servers provided with redundancy makes it possible to consolidate the data archives in a fine-grained manner, such that it is precisely the data of the time intervals that provide the qualitatively higher-value data which is recorded in both data archives.

Particularly preferably, the control system is configured to synchronize the two data archives of the first operator station server and the second operator station server, following the occurrence of a master/master scenario in a time interval, as previously explained. In this context, the term "master/master scenario" means that both the first operator station server and the second operator station server have performed the function of the master in one (or more) time intervals. This may come to pass, for example, due to a connection between the two operator station servers (temporarily) failing and the two operator station servers, without each knowing the function of the other operator station server, inheriting the function of master, in order to maintain operation of the technical installation.

It is also an object of the invention to provide a method for operating a control system designed with redundancy for a technical installation, in particular a process or manufacturing installation, which has a first operator station server and a second operator station server, where one of these operator station servers is configured to operate as master and the other of these operator station servers is configured to operate as slave, the slave is configured to inherit the function of master in the event that the master fails, a first data archive is implemented on the first operator station server, a second data archive is implemented on the second operator station server, the first operator station server and the second operator station server are configured to receive data of the technical installation and to record it in the respective data archive, and where the first operator station server and the second operator station server are each configured to ascertain a respective health state.

The method comprises a) continuously receiving data of the technical installation and recording the data in the respective archives, where the data is divided into certain time intervals, b) for each time interval, in each case ascertaining the respective health state via each of the two operator station servers and, for each time interval, assigning the health state of the respective operator station server to the data, and c) for each time interval, in each case recording in the respective data archive whether the respective operator station server acts as master or as slave in the time interval.

Preferably, the two data archives of the first operator station server and the second operator station server, following the storing of the data, the health status and the master/slave function, are synchronized such that, following the synchronization in both data archives, for each time interval the data of the operator station server that has the best health state in the respective time interval is recorded.

Particularly preferably, the two data archives of the first operator station server and the second operator station server, following the occurrence of a master/master scenario in a time interval, are synchronized as previously explained.

It is also an object of the invention to provide use of a control system for operation of a technical installation, in particular manufacturing or process installation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which these are achieved will now be made more clearly and distinctly intelligible in conjunction with the following description of an exemplary embodiment, which will be described in detail making reference to the drawings, in which.

DETAILED DESCRIPTION OF THE EXEMPLARY EMBODIMENTS

Figure 1:
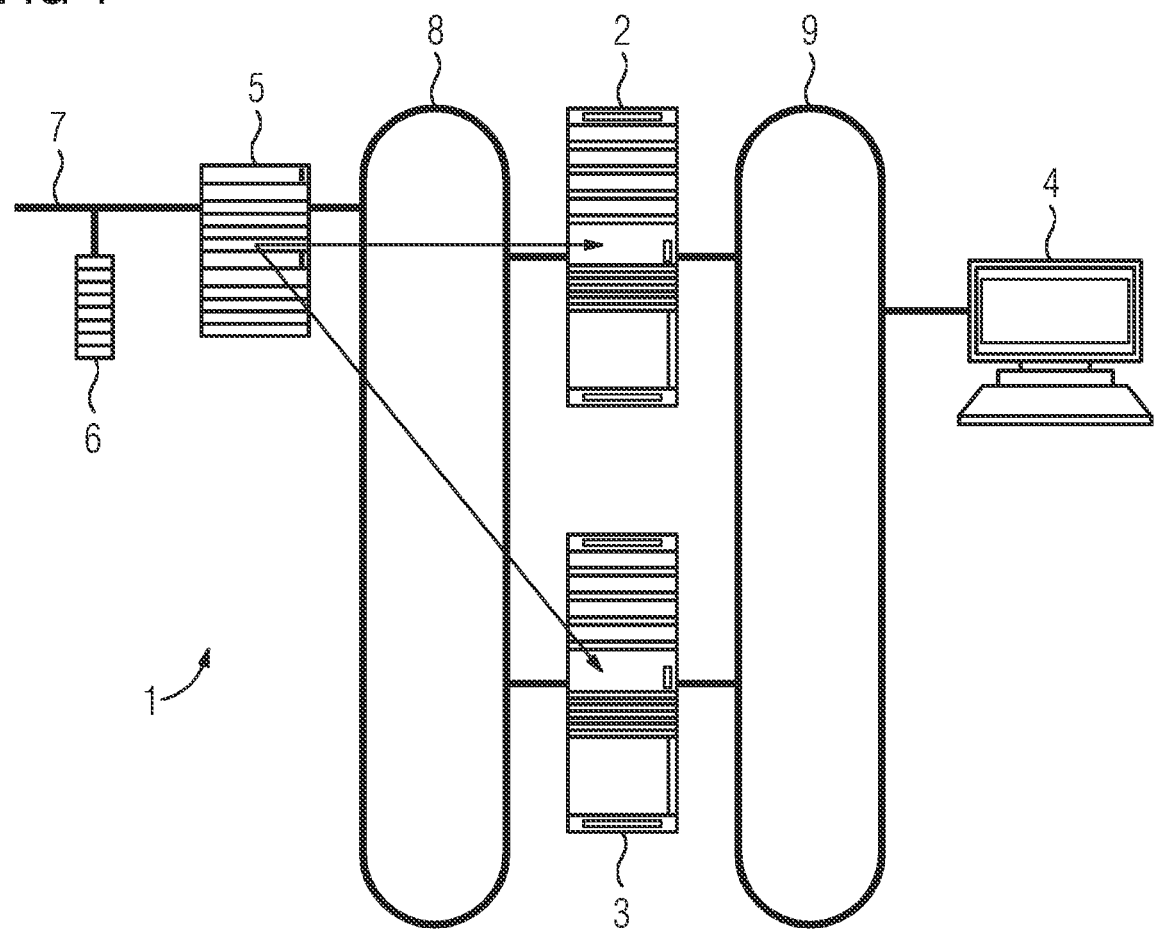
FIG. 1 shows a schematic illustration of an exemplary conventional control system.
Figure 2:
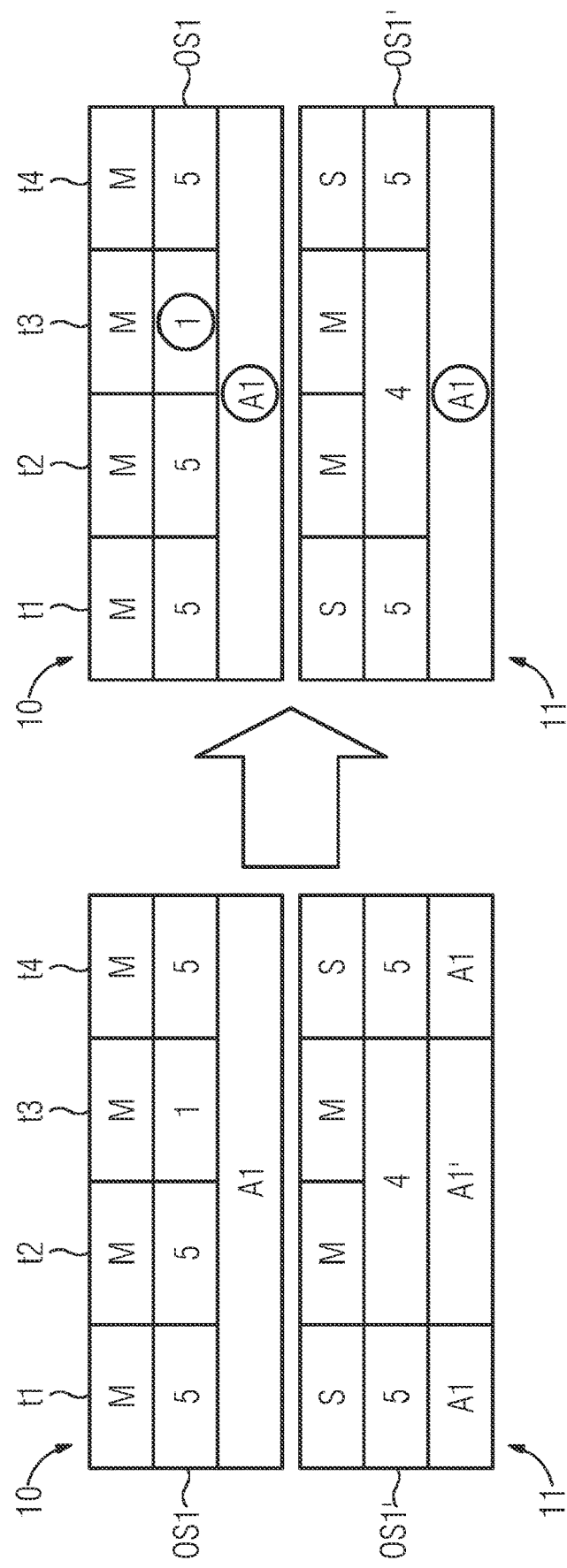
FIG. 2 shows a content of data archives of operator station servers in accordance with a first embodiment.

FIG. 2 shows the content of a first data archive 10 of a first operator station server OS1 and the content of a second data archive 11 of a second operator station server OS1'. The two operator station servers OS1, OS1' are part of a control system for a technical installation and are designed for redundant operation.

Shown on the left side of FIG. 2 is the content of the two data archives 10, 11 before synchronization of the two data archives 10, 11. In the first row of the data archives 10, 11, it is mapped whether associated operator station server OS1, OS1' has acted as master (M) or as slave (S) in the relevant time interval t1, t2, t3, t4. In the second row, a health state of the respective operator station server OS1, OS1' is shown. In this context, the value 5 indicates a "healthy" or "very good" health state, while the value 1 indicates an "unhealthy" or "very bad" health state.

The third row records the operator station server OS1, OS1' from which the values recorded in the respective data archive 10, 11 originate. This depends upon whether an operator station server OS1, OS1' acts as master or as slave. For the data archive 10 of the first operator station server OS1, for example, all data (for example, process data) originates from the first operator station server OS1 itself (characterized by "A1"), as it has acted as master in all four time-intervals.

The second operator station server OS1' has acted as slave in the first time-interval t1 and in the third time-interval t3, which is why it has recorded the data of the first operator station server 10 in its data archive 11 here. In the second time-interval t2 and in the third time-interval t3, it has acted as master, which is why it has recorded its own data in the second data archive 11 (characterized by "A1'"). It can be seen that both operator station servers OS1, OS1' have acted as master in the second time interval t2 and the third time interval t3, such as due to a network failure. This is referred to as master/master scenario. Following the discontinuation of network failure, both operator station servers OS1, OS1' have to be re-synchronized, in order to be able to resume redundant operation.

It is known, when reintegrating or synchronizing the two operator station servers OS1, OS1' (shown on the right side of the arrow in FIG. 2) during the reconciliation of the data archives 10, 11, to only (fully) inherit the values of the data archive 10, 11 (cf. the respective third row) which belongs to the operator station server OS1, OS1' that emerges as master following the reintegration. In the present example, this is the first operator station server OS1. It can be seen that, in both data archives 10, 11, the values of the first operator station server OS1, OS1' are inherited for the third time interval t3, despite the first operator station server OS1 having a very poor health state (value 1) in the time interval t3. The inherited data is therefore of potentially poor quality. The qualitatively higher-value data from the second operator station server OS1 is discarded.

Figure 3:
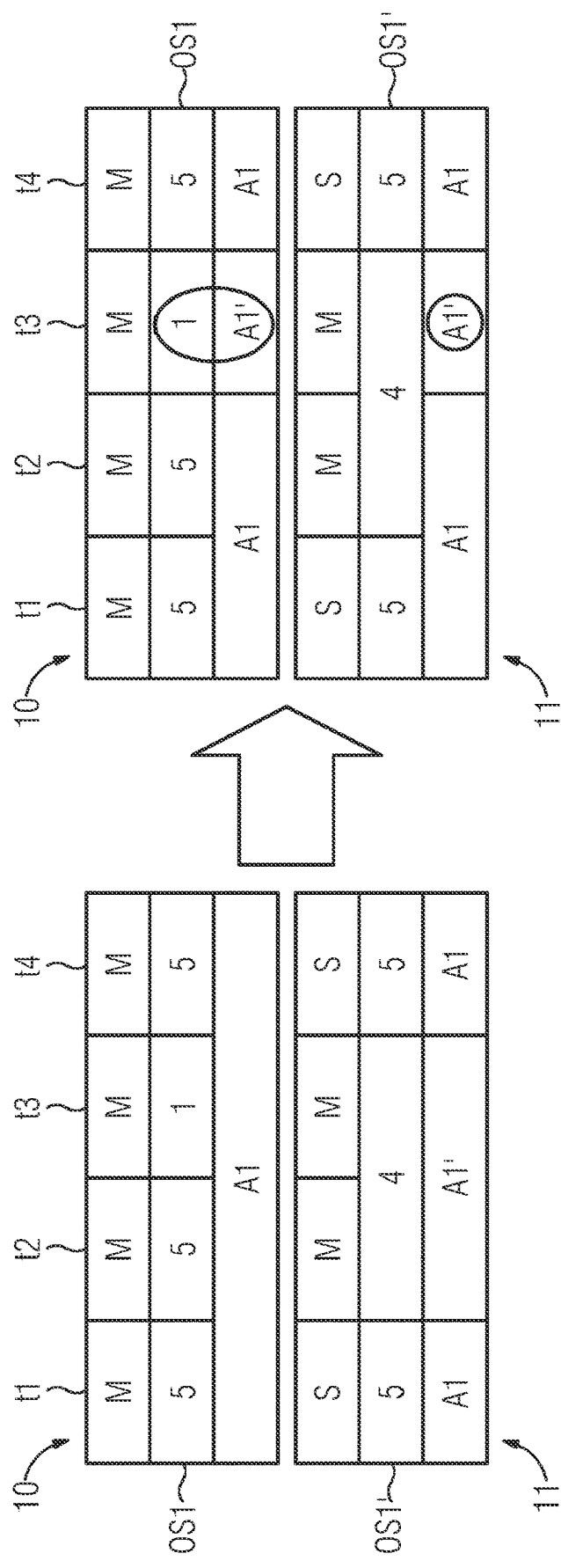
FIG. 3 shows a content of data archives of operator station servers in accordance with a second aspect.

In FIG. 3, two data archives 10, 11 of operator station servers OS1, OS1' are shown, which are part of a control system according to the invention. As opposed to the known method explained in FIG. 2, the representation in FIG. 3 illustrates that, during the synchronization of the operator station server OS1, OS1', the respective health state (second row) and the function as master or slave (third row) are taken into consideration.

The overlapping master function master/master in the second time interval t2 triggers a synchronization of the two data archives 10, 11. In the third time interval t3, in which the first operator station server OS1 has a very poor health state, during the synchronization the (process) values that the second, healthy operator station server OS1' has received in the time interval t3 are inherited for both data archives 10, 11 (symbolized by A1').

By way of this embodiment of the control system or by way of this method for operating a technical installation, it can be efficiently avoided that values that have a higher value are potentially lost.

Figure 4:
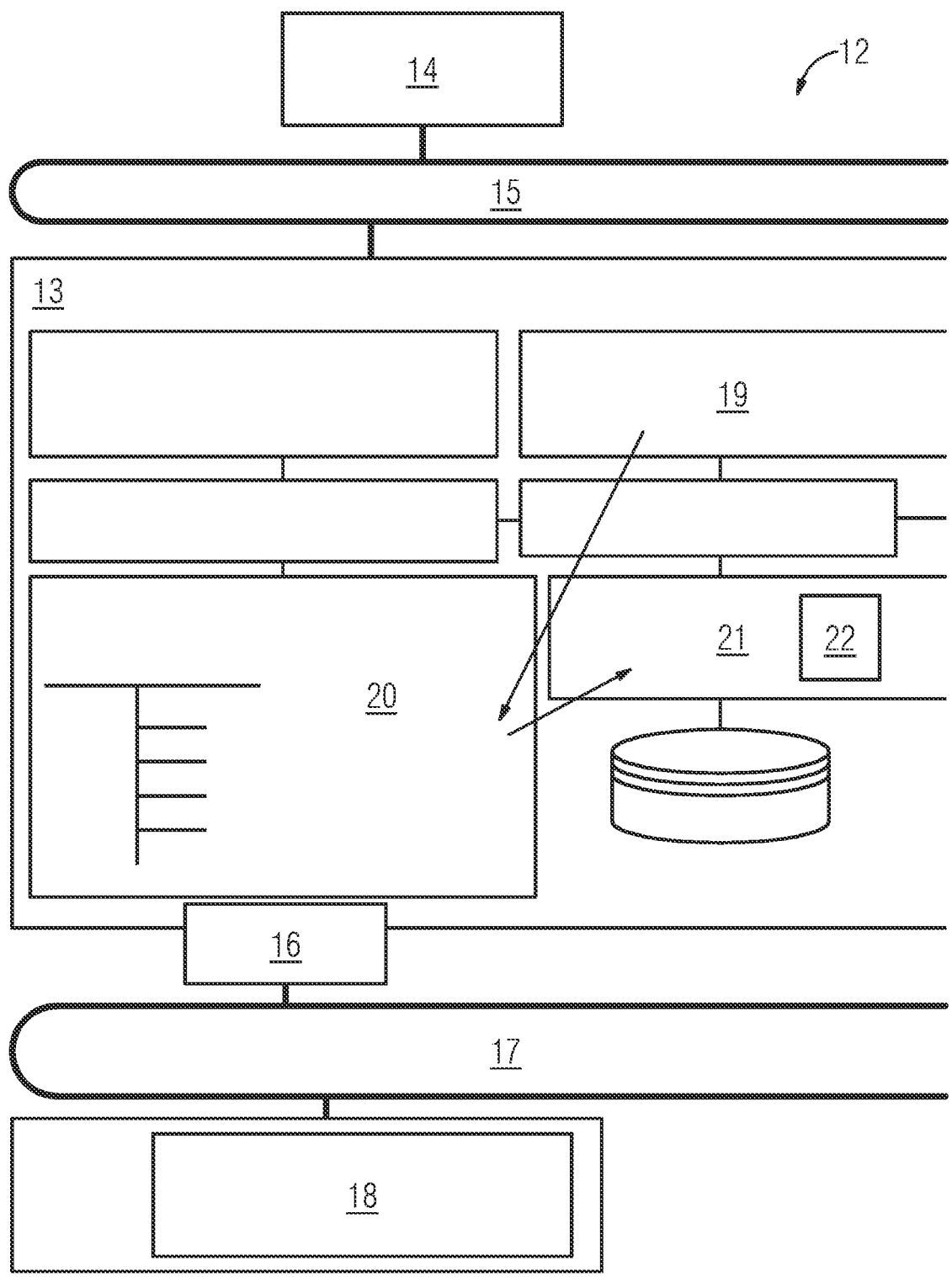
FIG. 4 shows a schematic illustration of a control system in accordance with the invention.

In FIG. 4, part of a control system 12 in accordance with the invention of a technical installation configured as a process installation, i.e., as a process engineering installation, is shown. The control system 12 comprises a first operator station server 13, a second operator station server (not shown) and an operator station client 14.

The first operator station server 13, the second operator station server and the operator station client 14 are interconnected via a terminal bus 15 and are optionally connected to further components (not shown) of the control system 12, such as an engineering station server.

A user or operator can access the operator station server 13 via the operator station client 14 via the terminal bus 15 for the purpose of operator control and monitoring. The terminal bus 15 can be formed as an industrial Ethernet, for example, without being limited thereto.

The two operator station servers 13, 14 are of identical construction, which is why FIG. 4 only indicates the construction of the first operator station server 13 (only referred to as "operator station server 13" below). The operator station server 13 has a device interface 16 which is connected to an installation bus 17. Via this device interface 16, the operator station server 13 can communicate with an automation device 18 as well as with optionally present further components of the process installation, such as peripheral devices (not shown). The installation bus 17 can be formed as an industrial Ethernet, for example, without being limited thereto. The automation device 18 may be connected to any number of subsystems (not shown).

A redundancy service 19, a process image 20 and a data archive 21 (inter alia) are implemented on the operator station server 13. The operator station client 14 is configured to represent an installation image for operator control and monitoring of the process installation, which is not indicated in further detail here, however.

The automation device 18 is configured to control and monitor an automation of the process installation. To this end, implemented on the automation device 18 is a control program, which has been loaded onto the automation device 18 as part of project planning of the automation of the process installation. The automation device 18 receives process data from the process installation and transfers this to the process image 20 of the operator station server 13.

The redundancy service 19 ascertains, in a manner known per se, a health state (health index) of the operator station server 13, records it in the process image 20 of the operator station server 13 and archives it in the data archive 21. Thus, once a master/master scenario has finished, the health state is available to the two operator station servers 13 provided with redundancy during the consolidation/synchronization of the data archives 21. Moreover, the functions that the operator station server 13 has performed in a certain time interval are stored as "server states" (master/slave) in the process image 20 and archived in the data archive 21, in order to be able to precisely pinpoint the period of time for a master/master scenario (OS1=M, OS1'=M).

Based on the archived health states and the functions of the individual operator station servers 13, a consolidation service performs the method explained on the basis of FIG. 3 in the data archives 21 of the two operator station servers 13. Following the reconciliation of the data archives 21, the content of the two data archives 21 is identical again, as shown in FIG. 3. As of this moment, transference of the data of the two data archives 21 into a central archive (not shown) of the control system 12 may occur, in order to implement a long-term archiving of the data. Should contents of the (local) data archives 21 have already been transferred to the central archive, then these can also be discarded following the reconciliation of the (local) data archives 21.

Overall, due to the control system 12 in accordance with the invention or the method associated therewith, a fine-grained reconciliation of the data archives 21 with the best possible process data is possible. By way of the invention, it is possible to make a contribution to a higher reliability and an improved operability of the control system of the technical installation.

Figure 5:
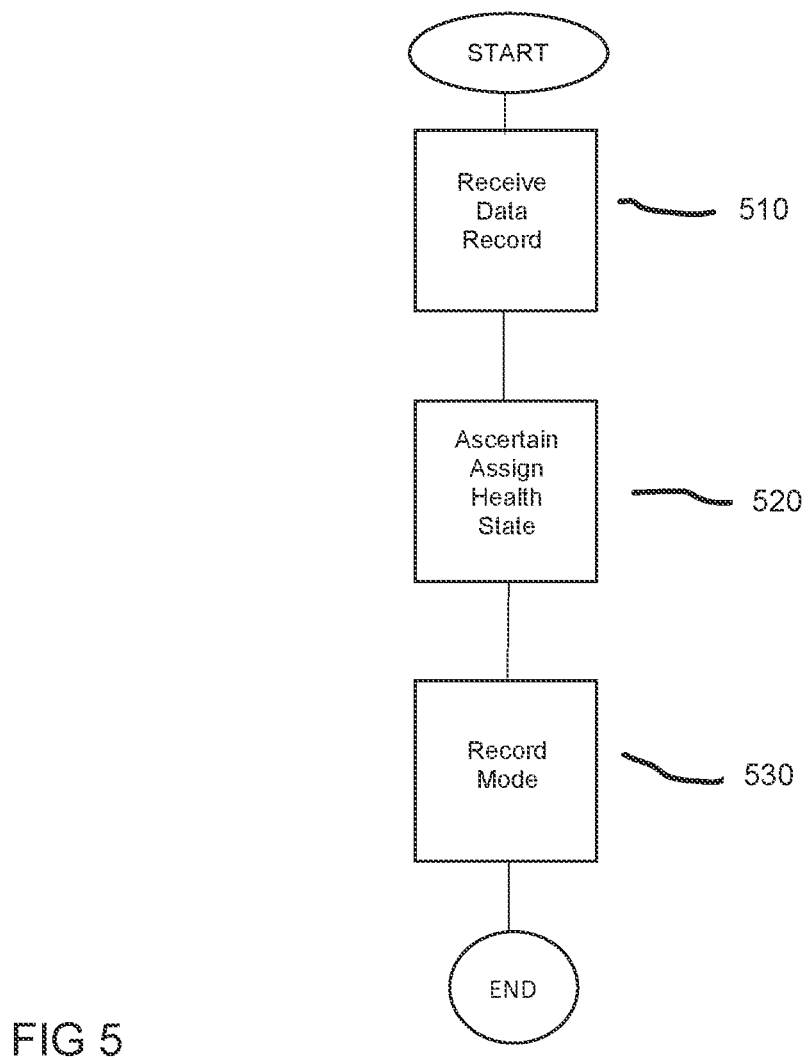
FIG. 5 is a flowchart of the method in accordance with the invention.

FIG. 5 is a flowchart of the method for operating a control system 12 provided with redundancy for a technical installation, which includes a first operator station server 13 and a second operator station server. In accordance with the method of the invention, one operator station of the first and second operator station servers 13 is configured to operate as a master station and another operator station of the first and second operator station servers 13 is configured to operate as a slave station, where the slave station is configured to inherit functionality of the master station in the event the master station fails, a first data archive 21 is implemented on the first operator station server 13, a second data archive is implemented on the second operator station server, the first operator station server 13 and the second operator station server are configured to receive data of the technical installation and to record the received data of the technical installation in a respective data archive 21, and where the first operator station server 13 and the second operator station server are each configured to ascertain a respective health state.

The method comprises a) receiving data of the technical installation continuously and recording the continuously received data in the respective data archives 21, as indicated in step 510. Here, the received data is divided into certain time intervals t1, t2, t3, t4, t5, t6.

Next, b) ascertaining each respective health state via each of the two operator station servers 13 for each time interval t1, t2, t3, t4, t5, t6 is ascertained, and the health state of the respective operator station server 13 is assigned to the data for each time interval t1, t2, t3, t4, t5, t6, as indicated in step 520.

Next, c) whether the respective operator station server 13 acts as the master station or as the slave station in the time interval is recorded in the respective data archive 21 for each time interval t1, t2, t3, t4, t5, t6, as indicated in step 530.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control system for a technical installation, the control system comprising:
a first operator station server;
a second operator station server, one operator station of the first and operator station servers being configured to operate as a master station and another operator station of first and second operator station servers being configured to operate as a slave station, and the slave station be configured to inherit a function of master station in an event that the master station fails;
wherein a first data archive is implemented on the first operator station server;
wherein a second data archive is implemented on the second operator station server;
wherein the first operator station server and the second operator station server are configured to receive data of the technical installation and record the received data of the technical installation in a respective data archive;
wherein the first operator station server and the second operator station server are each case configured to ascertain a respective health state;
wherein the first operator station server and the second operator station server are configured to continuously record in the respective data archive, at specified time intervals, which health state a respective operator station server has when receiving and recording the data of the technical installation, and whether the respective operator station server acts as the master station or as the slave station in a respective time interval.

2. The control system as claimed in claim 1, wherein the control system is configured to synchronize the two data archives of the first operator station server and the second operator station server following storage of the data, the health status and the master/slave function such that, following the synchronization in both data archives, for each time interval the data of the operator station server which has the best health state in the respective time interval is recorded.

3. The control system as claimed in claim 1, wherein the technical installation is a process or manufacturing installation.

4. The control system of claim 1, wherein the control system operates a technical installation comprising one of a manufacturing installation or process installation.

5. The control system as claimed in claim 2, wherein the control system is configured to synchronize the two data archives of the first operator station server and the second operator station server, following occurrence of a master/master scenario in a time interval.

6. A method for operating a control system provided with redundancy for a technical installation, which includes a first operator station server and a second operator station server, one operator station of the first and second operator station servers is configured to operate as a master station and another operator station of the first and second operator station servers is configured to operate as a slave station, the slave station being configured to inherit functionality of the master station in an event the master station fails, a first data archive being implemented on the first operator station server, a second data archive being implemented on the second operator station server, the first operator station server and the second operator station server being configured to receive data of the technical installation and to record the received data of the technical installation in a respective data archive, and the first operator station server and the second operator station server each being configured to ascertain a respective health state, the method comprising:
a) receiving data of the technical installation continuously and recording the continuously received data in the respective data archives, the received data being divided into certain time intervals;
b) ascertaining each respective health state via each of the two operator station servers for each time interval, and assigning the health state of the respective operator station server to the data for each time interval;
c) recording in the respective data archive whether the respective operator station server acts as the master station or as the slave station in the time interval for each time interval.

7. The method as claimed in claim 6, wherein the data archives of the first operator station server and the second operator station server, following storage of the data, the health status and the master/slave function, are synchronized such that, following the synchronization in both data archives, for each time interval the data of the operator station server which has a best health state in the respective time interval is recorded.

8. The method as claimed in claim 6, wherein the technical installation is a process or manufacturing installation.

9. The method of claim 6, wherein the control system operates a technical installation comprising one of a manufacturing installation or process installation.

10. The method as claimed in claim 7, wherein the data archives of the first operator station server and the second operator station server, following an occurrence of a master/master scenario in a time interval, are synchronized.

* * * * *